United States Patent
Kronander et al.

(10) Patent No.: US 8,983,484 B2
(45) Date of Patent: Mar. 17, 2015

(54) METHODS AND DEVICES FOR INTERSYSTEM QUIET PERIOD SYNCHRONIZATION

(75) Inventors: Jonas Kronander, Uppsala (SE); Yngve Selén, Uppsala (SE); Mikael Prytz, Rönninge (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 93 days.

(21) Appl. No.: 13/881,392

(22) PCT Filed: Nov. 5, 2010

(86) PCT No.: PCT/SE2010/051215
§ 371 (c)(1),
(2), (4) Date: Apr. 25, 2013

(87) PCT Pub. No.: WO2012/060756
PCT Pub. Date: May 10, 2012

(65) Prior Publication Data
US 2013/0237238 A1    Sep. 12, 2013

(51) Int. Cl.
| | |
|---|---|
| H04W 72/00 | (2009.01) |
| H04W 16/14 | (2009.01) |
| H04W 48/16 | (2009.01) |
| H04W 72/12 | (2009.01) |

(52) U.S. Cl.
CPC ............. *H04W 16/14* (2013.01); *H04W 48/16* (2013.01); *H04W 72/1278* (2013.01)
USPC ........................................ 455/452.1; 455/509

(58) Field of Classification Search
None
See application file for complete search history.

(56) References Cited

U.S. PATENT DOCUMENTS

| | | | |
|---|---|---|---|
| 8,224,364 B2 * | 7/2012 | Gurney et al. | 455/509 |
| 2010/0203914 A1 | 8/2010 | Shan et al. | |
| 2010/0246442 A1 * | 9/2010 | Wang et al. | 370/254 |

FOREIGN PATENT DOCUMENTS

| | | |
|---|---|---|
| EP | 1 850 611 A1 | 10/2007 |
| WO | WO 2007/096819 A2 | 8/2007 |
| WO | WO 2009/069069 A2 | 6/2009 |

OTHER PUBLICATIONS

International Search Report, PCT Application No. PCT/SE2010/051215, Jul. 6, 2011.
Written Opinion of the International Searching Authority, PCT Application No. PCT/SE2010/051215, Jul. 6, 2011.
(Continued)

*Primary Examiner* — Erika A Washington
(74) *Attorney, Agent, or Firm* — Myers Bigel Sibley & Sajovec, P.A.

(57) ABSTRACT

The present invention relates to the technical field of dynamic spectrum access. Synchronization of quiet periods for spectrum sensing can significantly benefit sharing of available secondary access spectrum between two or more wireless communication systems in the same geographic region. The object of the present invention is to provide a methodology by which quiet periods can be synchronized in time between different secondary access wireless communication systems. Quiet Period Clients (QPC) of secondary access wireless communication systems are adapted to send requests to a Quiet Period Server (QPS) to obtain a quiet period rule set. The QPC receives from the QPS an answer specifying the quiet period rule set, and optional quiet period synchronization information. The systems perform their transmissions in accordance with the received rules.

16 Claims, 10 Drawing Sheets

(56) References Cited

OTHER PUBLICATIONS

International Preliminary Report on Patentability, PCT Application No. PCT/SE2010/051215, Nov. 1, 2012.

C. Cordeiro et al.; "Spectrum Sensing for Dynamic Spectrum Access of TV Bands" Cognitive Radio Oriented Wireless Networks and Communications, 2007. CrownCom 2007. $2^{nd}$ International Conference on, pp. 225-233, Aug. 1-3, 2007; doi: 10.1109/CROWNCOM.2007.4549801. URL: http://ieeexplore.ieee.org/stamp/stamp.jsp?tp=&arnumber=4549801&isnumber=4549754; Chapter B.3.

IEEE P802.22™/DRAFTv2.0; Draft Standard for Wireless Regional Area Networks Part 22: Cognitive Wireless RAN Medium Access Control (MAC) and Physical Layer (PHY) specifications: Policies and procedures for operation in the TV Brands. Copyright 2008 by the Institute of Electrical and Electronics Engineers, Inc. Three Park Avenue New York, New York 10016-5997, USA All rights reserved. May 2009; 134 pages.

* cited by examiner

Region view

METHODS AND DEVICES FOR INTERSYSTEM QUIET PERIOD SYNCHRONIZATION

CROSS REFERENCE TO RELATED APPLICATION

This application is a 35 U.S.C. §371 national stage application of PCT International Application No. PCT/SE2010/051215, filed on 5 Nov. 2010, the disclosure and content of which is incorporated by reference herein in its entirety. The above-referenced PCT International Application was published in the English language as International Publication No. WO 2012/060756 A1 on 10 May 2012.

TECHNICAL FIELD

The present invention relates to the field of dynamic spectrum access, and in particular to methods and devices for supporting intersystem quiet period synchronization of secondary wireless access systems.

BACKGROUND

Dynamic spectrum access, or cognitive radio communication, is a technique in which a device monitors radio channels on any potential frequency band for activity, and establishes communications only on an inactive channel. The usage of radio spectrum may therefore be improved in that frequency bands are not exclusively assigned to a particular transmission system, largely based on the observation that spectrum assigned by licenses to licensees is often not used. One approach pursued in regulations is to license the spectrum to a licensee, denoted primary user, while at the same time the frequency band can be used by other users, denoted secondary users, under the condition that they do not interfere too much with the system operation of the primary user.

To ensure that a secondary user do not cause excessive interference, that harms the communication of the primary users of the spectrum, spectrum sensing can be employed. Spectrum sensing means that the secondary user, alone or cooperatively together with other secondary users, uses detection mechanisms to determine if a primary transmission is present in the spectrum or not. One common and simple method for spectrum sensing is energy detection, where the secondary user measures the received energy on a frequency band and compares the result with a threshold. If the received energy is above the threshold the user decides that a primary transmission is taking place and hence the secondary user should refrain from transmissions on that band until it can be established that there are no longer any primary transmissions present. On the other hand if the received energy falls below the threshold secondary user assumes that the frequency band is free, implying that the secondary user may use it for its own transmissions.

Many variants and methods for spectrum sensing have been proposed in the research literature over the years and the above simple energy detection scheme is just one of these. There exist a multitude of different methods for spectrum sensing in the literature. Some are specific to very specific types or signals, or signals with certain properties, such as matched filtering approaches or cyclostationary detection methods. Others are more general, e.g., energy detection or eigenvalue distribution based methods. The former set of methods can typically be used for detection of a particular system of interest, e.g., a specific primary user system, whereas the latter set of methods can typically be used when the other potentially present systems are unknown or if less specific knowledge of the radio environment is required. A comprehensive summary of spectrum sensing methods is disclosed in e.g., [Erik Axell, "Topics in Spectrum Sensing for Cognitive Radio", Linköping Studies in Science and Technology, Licentiate Thesis no 1417, 2009.].

Generally, for all detection methods, the noise level should be as low as possible. By "noise" one here means "everything in the received signal which does not originate from what one wishes to detect", e.g., any contribution to the signal which does not originate from a primary user. For this reason it has been proposed in various forums that quiet periods should be introduced in a wireless system that opportunistically accesses the spectrum to allow the spectrum sensing mechanisms to detect the potential primary user transmissions. This feature is implemented, e.g., in the IEEE 802.22 standard.

In short; spectrum sensing for primary usage detection benefits from quiet periods.

From the patent application publication WO/2009/069069, titled "DISTRIBUTED SCHEDULING OF QUIET-PERIOD FOR IN-SERVICE CHANNEL MONITORING", is earlier known a system using spectrum sensing for primary usage detection. However, the system is only for intra system use only. Every user equipment reports required lengths of sensing periods and the total system adapts the quiet period to the longest demand. Techniques are also provided for efficient coordination of on-demand quiet-period requests, and for supporting different quiet-period schedules for multiple classes of primary users.

The main drawback with the existing solutions is that they only consider quiet periods in one system. However, if several different secondary systems employ spectrum sensing in the same spatial region to detect the primary users, said secondary systems may falsely detect each other as a primary user that needs to be protected. This is not what is intended with the introduction of quiet periods, since the access of spectrum opportunistically in a secondary manner is often supposed to be on equal terms between the present secondary users. This means that no secondary transmission should have priority over and be more protected than any other secondary transmission. Further, even if good detection methods specific to the primary system are available, the presence of secondary transmissions will increase the noise level, with the above definition of noise, and make primary user detection more difficult. To conclude, intra-system quiet period synchronization is beneficial for sensing, but does not solve the problem with interference between different secondary systems.

SUMMARY

The present disclosure relates to the technical field of dynamic spectrum access.

Synchronization of quiet periods for spectrum sensing can significantly benefit sharing of available secondary access spectrum between two or more wireless communication systems in the same geographic region.

An object of some embodiments is to provide a methodology by which quiet periods can be synchronized in time between different secondary access wireless communication systems. This allows sensing with the spectrum uncontaminated from other secondary usage, which can increase the sensing performance and significantly reduce the risk of falsely detecting secondary usage as primary usage.

One aspect is to provide a solution of the synchronization problem between systems that may follow different standards and implements different dynamic radio access technologies.

According to a first aspect, some embodiments provide a method in a first network node for supporting intersystem quiet period synchronization of secondary wireless access systems coexisting on a frequency spectrum used by a primary system in a, for said systems, common geographical area. The method comprises obtaining a quiet period rule set from a second network node, said quiet period rule set being common to all or a number of said secondary wireless access systems; and instructing one or more access nodes, which are part of said secondary wireless access systems, to perform transmission according to the obtained quiet period rule set, thereby enabling synchronized quiet periods for all secondary wireless access systems.

According to a second aspect, some embodiments provide a method in a second network node for supporting intersystem quiet period synchronization of secondary wireless access systems coexisting on a frequency spectrum used by a primary system in one for said systems common geographical area. The method comprises providing a quiet period rule set to a first network node serving a secondary wireless access system, thereby enabling synchronized quiet periods for all secondary wireless access systems in the geographical area.

According to a third aspect, some embodiments provide a node device in a first network node for supporting intersystem quiet period synchronization of secondary wireless access systems coexisting on a frequency spectrum used by a primary system in one for said systems common geographical area. The device comprises a Quiet Period Adaptation Unit configured to obtain a quiet period rule set from a second network node. Said rule set is common to all or a number of said secondary wireless access systems. The Quiet Period Adaptation Unit is further configured to instruct one or more access nodes, which are a part of said secondary wireless access systems to perform transmission according to the obtained quiet period rule set, thereby enabling synchronized quiet period for all secondary wireless access systems.

According to a fourth aspect, some embodiments provide a device in a second network node for supporting intersystem quiet period synchronization of secondary wireless access systems coexisting on a frequency spectrum used by a primary system in one, for said systems, common geographical area. The device comprises a Quiet Period Decision Unit configured to provide a quiet period rule set to a first network node serving a secondary wireless access system, thereby enabling synchronized quiet periods for all secondary wireless access systems.

According to some embodiments, the first network node may be a client network node comprising a Quiet Period Client, QPC, for performing said method, and which is associated to a Quiet Period Server, QPS, in said second network node, which is an intersystem node, common to all or a number of secondary wireless access systems in the geographical area.

According to other embodiments, the information on the quiet period rule set may be transmitted via unicast, multicast or broadcast transmission and the system decodes the information and adjusts its transmissions accordingly.

According to other embodiments, a mechanism may be involved for reporting system properties that may be used as a basis for quiet period rule set decision process.

One advantage of the present invention is that it provides an easy and straightforward solution to the intersystem quiet period synchronization problem.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced and other embodiments that depart from these specific details. In other instances, detailed descriptions of well known methods, devices, and circuits are omitted so as not to obscure the description of the present invention with unnecessary detail.

Figure 1:
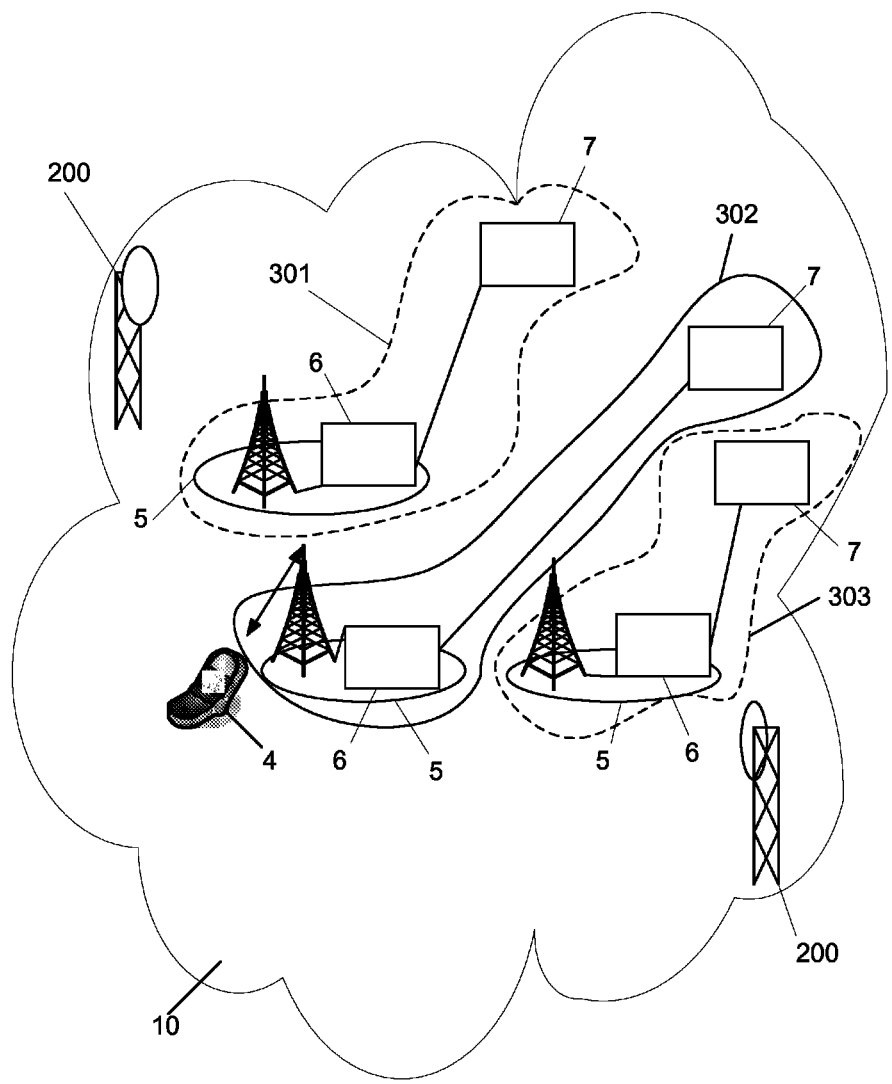
FIG. 1 is a block diagram of an exemplary network in which systems and methods described herein may be implemented.

FIG. 1 is illustrating prior art. In a geographical region 10 is a number of transmission systems 200, 301, 302, 303 coexisting. Said systems are operating in the radio frequency spectrum, preferably in different frequency bands to which they are exclusively assigned. In the illustrated example, the television broadcasting system 200, indicated by broadcasting antenna masts in the figure, for distributing the radio waves over the geographical area 10. Further, in said area different wireless telecommunication systems 301, 302, 303 are operating in another frequency band for serving end user equipment, here illustrated as a mobile phone 4. The television broadcasting system 200 is using one frequency band F1 (not illustrated) and wireless systems 301, 302, 303 are assigned to another frequency band F2 (not illustrated) of the radio spectrum. The wireless telecommunication systems 301, 302, 303 may operate according to any standard, e.g. Global System for Mobile communication (GSM), Enhanced Data rates for GSM Evolution (EDGE), Code Division Multiple Access 2000 (CDMA2000), 3GPP, 3GPP LTE etc. The wireless telecommunication systems involve Radio Access Networks, RANs, which comprise access nodes for serving the users within areas, such as cells. The access nodes 5 are schematically illustrated with a base station 6 connected to a switching and/or routing functionality block Mobile Switching Centers, MSC:s, or Media Gateway Servers, MGS:s 7. The present invention is not limited to any special radio access technology, e.g. Wideband Code Division Multiple Access (WCDMA), Long Term Evolution (LTE), Time Division Multiplex Access (TDMA), etc, and therefore any radio access standard may be used.

The frequency spectrum F1 is assigned, or licensed, to licensees, but said licensees may not use the assigned spectrum during certain time intervals and/or spatial (geographic) regions. As stated, the usage of radio spectrum is being changed so that frequency bands are not exclusively assigned to a particular transmission system. A frequency band F1 may therefore be licensed to a licensee, hereafter denoted primary user, while at the same time the frequency band F1 may be used by other users, hereafter denoted secondary users, under the condition that they do not interfere with the system operation of the primary users. Therefore, spectrum sensing for primary usage detection is used.

A system using spectrum sensing for primary usage utilizing detection quiet periods is earlier known from the patent application publication WO/2009/069069, titled "DISTRIBUTED SCHEDULING OF QUIET-PERIOD FOR IN-SERVICE CHANNEL MONITORING".

In the known system, dynamically re-locatable secondary user devices are operating in an environment of primary user devices. The secondary user devices are configured to avoid interfering with these primary users while also using channels in the spectrum.

In the known example, a secondary user device is provided with a unit for sensing for usage of different frequency bands. The example device includes quiet-period parameters of the device in the network with the highest demand for sensing time. The secondary user device includes a message processor for transmitting and receiving messages, and a transmitter that transmits messages and other signals, subject to the agreed-upon quiet-period restrictions. Preferably, a quiet-period processor is configured to control the regular quiet-period processing, monitoring, and control consistent with a quiet-period control method. The quiet-period processor is configured to assert that no transmission are performed during any regular quiet-period based on a set of agreed-upon quiet-period parameters, and is also configured to notify other devices whenever it is configured to avoid transmission during an allocated time-slot using a protocol that provides reserved time segments. In more detail, the processor is configured to broadcast one or more quiet period parameters and to receive one or more other quiet-period parameters from another device. Further, the processor sets at least one of the quiet-period parameters equal to at least one of the other quiet-period parameters, if a sensing demand of the other device is greater than a sensing rate of the device. Said processor controls the transmitter to avoid transmission during a quiet-period corresponding to the quiet-period parameters. The sensing demand of the other device is based on one or more of the quiet-period parameters of the other devices, and the sensing rate of the device is based on one or more of the quiet-period parameters of the device.

However, the known system is only for intra system use only. The main drawback and problem with the existing solutions is that they only consider quiet periods in one system. However, if several different secondary systems employ spectrum sensing in the same spatial region to detect the primary users, said secondary systems may falsely detect each other as a primary user that needs to be protected.

The present invention addresses said drawback and problem in the prior art spectrum sensing by providing a synchronization of quiet periods between two or more wireless communication systems sharing the available secondary access spectrum in the same geographic region.

Figure 2:
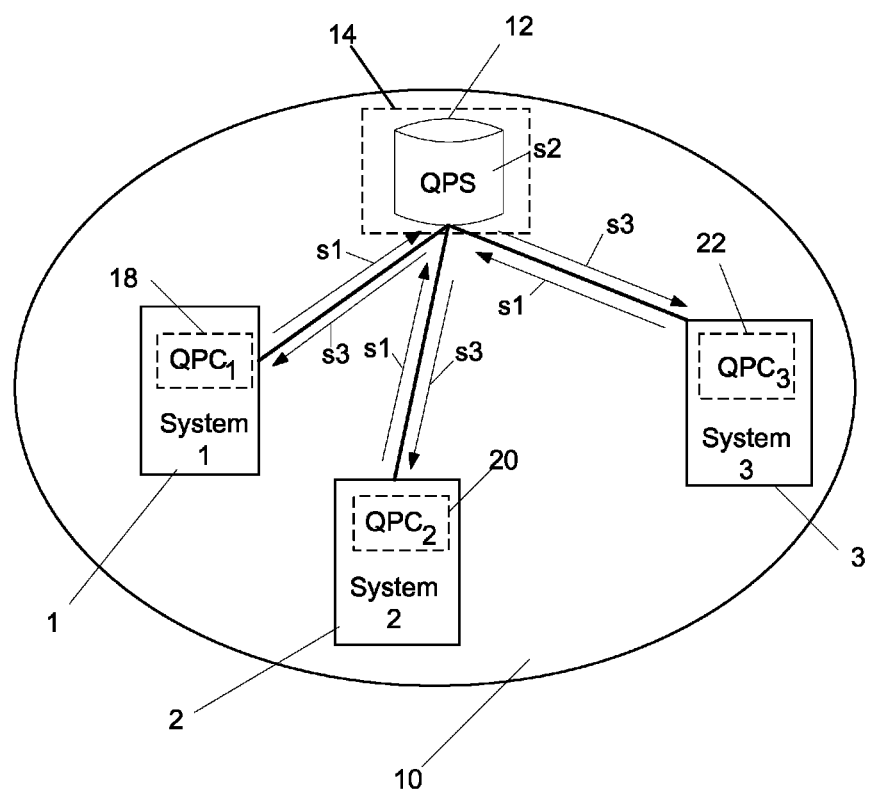
FIG. 2 is a block diagram illustrating an embodiment of a system providing a synchronization of quiet periods according to the present invention.

FIG. 2 is an illustration of a system embodiment providing a synchronization of quiet periods according to the present invention. FIG. 2 shows an example coverage region 10 comprising three systems 1, 2, 3 denoted secondary system 1, secondary system 2, and secondary system 3, respectively. Each of said systems i involves a Quiet Period Client, QPC, unit—$QPC_1$ in a node 18 of secondary system 1, $QPC_2$ in a node 20 of secondary system 2, and $QPC_3$ in a node 22 of secondary system 3. Generally, each $QPC_i$, i=1, 2, 3, . . . is connected to or capable of connecting to a common Quiet Period Server, QPS, unit 12 in an intersystem node 14.

In the coverage region 10, said three systems 1, 2, 3 simultaneously request access to a primary spectrum resource F1 on a secondary basis.

Consider the geographical region 10 with at least one system i that requires information about rules for quiet period sensing to ensure efficient secondary spectrum access. The rules in the region are coordinated by the Quiet Period Server, QPS, 12 in a node 14 which receives requests for quiet period rules messages and replies with the current applicable rules and other pertinent information. Each secondary system 1, 2, 3 uses the Quiet Period Client, $QPC_i$, to manage the interaction with the QPS 12 and to ensure that the system adapts its secondary spectrum access sensing behavior to the rules received from the QPS 12. The QPS and $QPC_i$ apparatuses, and their component units, are described in detail further below. The $QPC_i$ unit in each secondary system interacts with the QPS 12 that coordinates quiet period rules for the region. s1, s2, and s3 indicate the three main steps of this interaction.

This section outlines the interaction, and the principal protocol structure, between the QPS and $QPC_i$ and the effects the invention has on the overall behavior of systems that simultaneously wants to access a given spectrum resource in a particular region on a secondary basis. A protocol is suggested that is briefly outlined as follows:

1. A secondary access wireless communication system sends a request to a quiet period server to obtain a quiet period rule set.
2. The system receives an answer specifying the quiet period rule set, and optional quiet period synchronization information.
3. The system performs its transmissions in accordance with the rules received in 2.

In FIG. 2, the three interaction steps of the invention are as follows:
s1) A $QPC_i$ in a node of a secondary system i transmits a request rules message to the QPS situated in an intersystem node. This message may include the current quiet period rules, the desired quiet period rules and sensing method(s) used in the system as well as additional information (see below for details on example embodiments).
s2) The Quiet Period Server situated in the intersystem node receives the request rules message, and decides on the appropriate quiet period rule set for the system based on at least one of the following information:
Policies;
Requirements from the requesting system;
Requirements from other, present secondary systems.
Said information is preferably stored in a storage of the QPS.
s3) Information on synchronized quiet period rules is signalled from the QPS to the $QPC_i$:s of the coexisting secondary systems in a rules specification message. In addition to containing the rules for quiet periods, such as specifying when these should occur and their lengths, this message optionally contains a time parameter t_expire that specifies a time when the systems should check if the quiet period rule set has been updated. This is to ensure that all secondary systems are eventually informed of the presence of potential new secondary systems and updated quiet period rule sets.

The QPS is responsible for coordination of a number of secondary systems and the sensing quiet period specification for each secondary system i resides in a database. Each secondary system i may have a $QPC_i$ being responsible for the coordination of the quiet period rules of wireless access nodes in its secondary system. A database in the QPC is configured to store the desired quit period rule sets of the system it is dedicated to.

The desired rules are, or the desired rule set is, the preferences of a secondary system for the quiet period rule set that is to be decided on by the QPS. In this sense, the desired rules make up the optimal quiet period rule set from the perspective of the secondary system. In one embodiment of the invention, when there is only one secondary system present, the desired rule set of the secondary system will be considered by the QPS, and the QPS may decide that the desired quiet period rule set is to be applied to all secondary systems in the area, i.e. the single secondary system. If a second secondary system enters into operation the parameter t_expire will ensure that the QPC of the first secondary system checks back with the QPS at a later time and hence allows the QPS to update the quiet period rule set to account for the new situation.

In FIG. 2, each of the secondary system i is transmitting a request rules message. There is no coordination between these message transmissions. Each system may generate a request rules message independently of other secondary systems.

The QPS may be controlling and communicating with one or more QPCs, as illustrated in FIG. 2. The QPS and each $QPC_i$ of the secondary systems i in FIG. 2 is configured to operate and communicate in the similar way, i.e. in accordance with the present invention. When describing embodiments of the present invention in more detail, it is therefore enough to describe one QPS unit in an intersystem network node and one QPC unit in a node in anyone of the secondary system networks.

Figure 3:
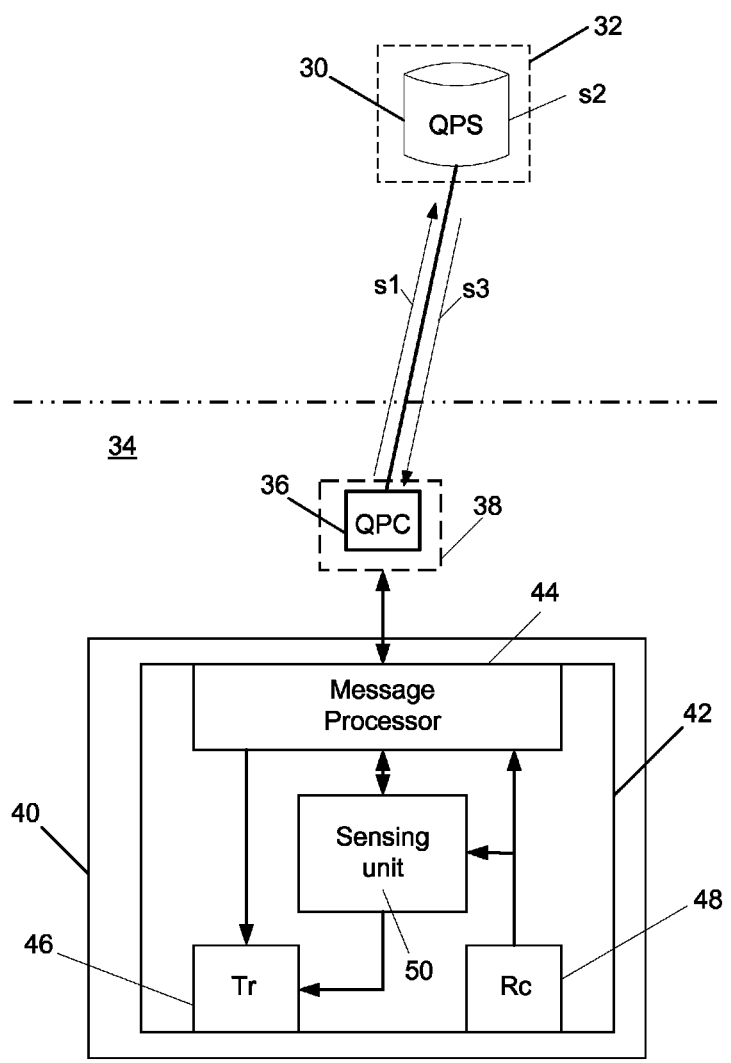
FIG. 3 is a block diagram illustrating a system network according to one embodiment of the invention.

FIG. 3 is an illustration of a system network according to one embodiment of the invention. Said network is comprising one Quiet Period Server, QPS, unit 30 in a QPS node 32 and a number of secondary system networks of which only one secondary system 34 is illustrated. Said secondary system network 34 is comprising a Quiet Period Client, QPC, unit 36 in a QPC node 38. The QPC 36 is responsible for the coordination of the quiet period rules used in the secondary system 34 and the QPC 36 is configured to communicate with one or more access nodes 40 in the system. A time parameter t_expire is set in the QPC unit 36 and it is used for indicating when it is time for the QPC 36 to generate and send a request rules message to the QPS. The request rules message is sent by the QPC to the QPS, as indicated by the arrow s1 in the figure. The QPS receives the request rules message and takes a decision, s2, based on the stored information and the present information received in the request rules message. The QPS 30 is provided with a decision process for forming the decision by means of the available information and said process is executed, e.g. when a request rules message is received. The decision process is preferably implemented as software program executed by a software processor device, such as a computer.

The result of the decision process is information on synchronized quiet period rules, which is inserted into a generated rules specification message. The rules specification message is then addressed and sent, s3, to the QPC node 38 of the requesting secondary system.

At the reception of the rules specification message, the QPC 36 will distribute the received rules to the access nodes 40 of its secondary system network 34 for which said QPC is responsible.

In the figure, only one of the access nodes 40 is illustrated. An access node 40 generally comprises a plurality of components for enabling access for wireless user equipments, and enabling communication between said user equipments and a core network. Said access node is typically a node in a Radio Access Network RAN. Only the components of interest for understanding the meaning of the present invention are illustrated. A device 42 in the access node 40 according to the illustrated example is provided with a message processor 44, a sensing unit 50, a transmitter 46 and a receiver 48.

Thus, when the QPC 36 obtains a quiet period rule set from a second network node 32, in this case the intersystem QPS node 32, the QPC 36 is configured to instruct one or more access nodes 40, which are part of said secondary wireless access system, to perform transmission according to the obtained quiet period rule set, thereby enabling synchronized quiet periods for all secondary wireless access systems. Thus, any secondary radio communication in the primary frequency spectrum F1 will not be performed during a quiet period.

The QPC 36 will instruct the access nodes 40 registered to the QPC by sending the received quiet period rules. A message processor 44 in the access nodes will receive the message with the quiet period rules to be used during the next time period. The received message may be the rules specification message received by the QPC and forwarded by the QPC to the access nodes. The message processor 44 will identify the message and distribute the new rule set to the sensing unit 50, which will store and use the received rules. The sensing unit 50 will be able to control the receiver 48 and transmitter 46 according to the new rules. The access node 40 will be able to perform spectrum sensing on the primary frequency band F1 during the quiet periods set by the rules and to receive radio traffic during the time periods between the quiet periods by means of the receiver. The sensing unit 50 is further configured to control the transmitter 46 to only transmit in the primary frequency band F1 in the periods between the quiet periods if not said frequency band is used by the primary users. One common and simple method for spectrum sensing is energy detection, where the secondary user measures the received energy on a frequency band and compares the result with a threshold. If the received energy is above the threshold the user decides that a primary transmission is taking place and hence the secondary user should refrain from transmissions on that band until it can be established that there are no longer any primary transmissions present. On the other hand if the received energy falls below the threshold secondary user assumes that the frequency band is free, implying that the secondary user may use it for its own transmissions.

Figure 4:
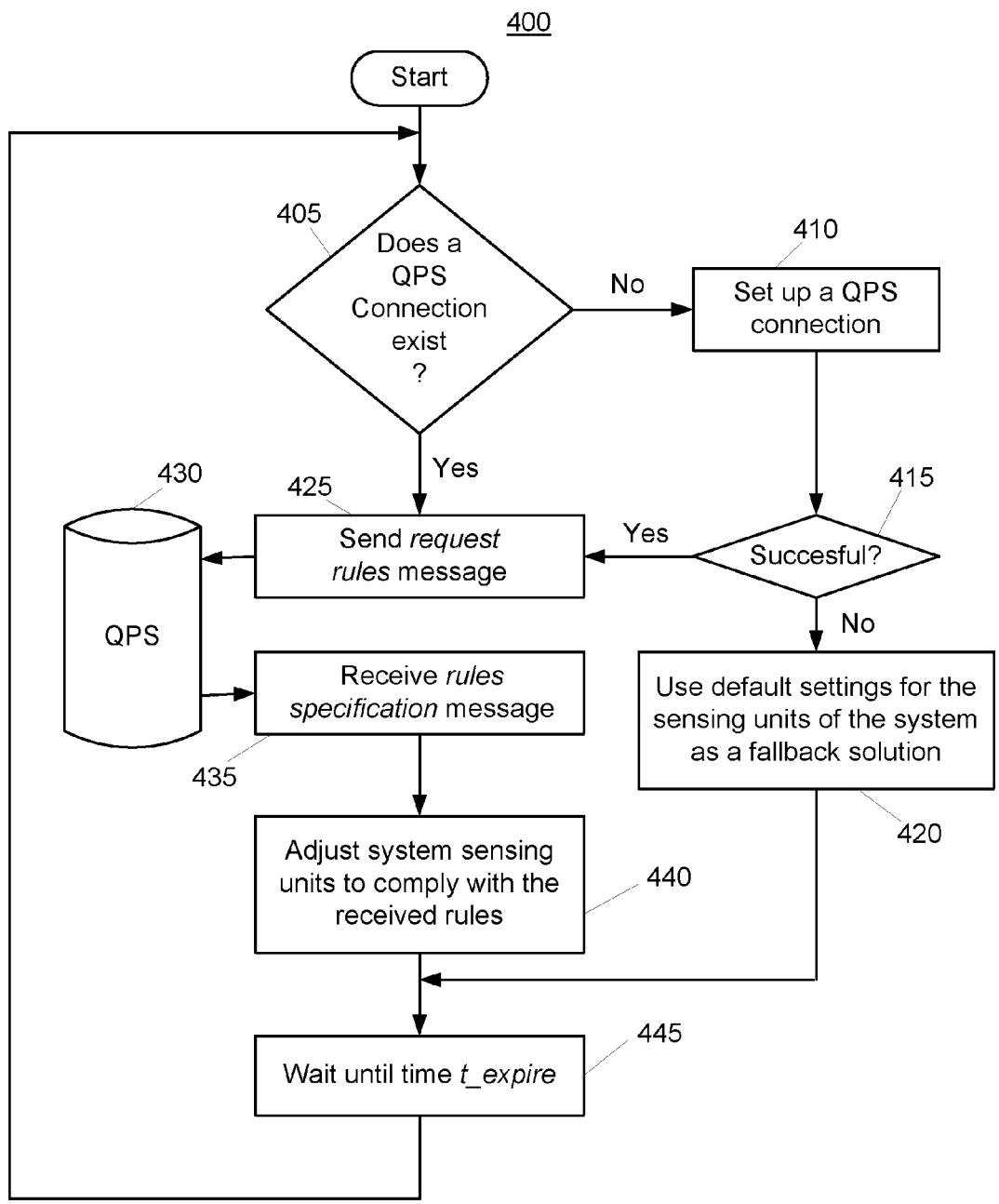
FIG. 4 is a flowchart illustrating an embodiment of the method according to the present invention.

An embodiment of a method 400 according to the present invention is illustrated in FIG. 4. The flowchart presents the actions specified according to one embodiment protocol that is to be followed by a QPC node 36 in a secondary system 34 that will employ frequency spectrum sensing to access a primary spectrum F1 opportunistically as a secondary user.

A QPC node 38 of a secondary system 34 is configured to communicate with a QPS node 32 to obtain a quiet period rule set to be used for a predetermined time period. Each QPC node 38 has the necessary information, e.g. IP address of the QPS node 32, to be able to connect to its dedicated QPS node. The QPS node is provided with a database and in said database is the QPC nodes and their secondary systems registered. The communication between the QPC nodes of the secondary systems and a QPS node may be performed over fixed or wireless links. If a wireless link is used, some wireless communication Radio Access Technology, RAT, are adapted to also use primary spectrum may be used for this communication. Another possibility is that the communication is performed over the internet and the secondary systems use some standard communication technologies that are not relying on spectrum sensing to access the internet.

The embodiment of the invention will now be presented in more detail with reference to FIG. 4:

405: The QPC of a secondary system checks if there is an existing connection to the QPS node comprising a database and quiet period decision unit.

410: If this is not the case, No, the QPC tries to set up a connection;

415: A connection set up check is performed.

420: If the setup is not successful, No, the QPC uses some default quiet period rule set for the sensing units as a fallback. Said default quiet period rule set will be used until the expiration of a default (preset) t_expire, 445. When said expiration time is reached, the QPC is adapted to establish a connection, 405, 410, 415, with the QPS node and send, 425, a new request rules message;

425: Send a request rules message. If the system has an existing connection to the database, Yes in 405, or if the system has successfully established a connection, 410 and Yes in 415, the QPC of the system sends a request rules message to its registered QPS node.

430: Receiving request rules message, performing decision process and sending rules specification message as a response performed by the QPS in the OPS node. The QPS node receives the message and replies with a rules specification message which contains the current rules for quiet periods. The rule specification message may also contain a time field t_expire, at which the secondary system can no longer assume that the existing rule set is valid. If it needs to perform sensing using synchronized quiet periods beyond this time, it should first send a new request rules message for receiving possible updated rules. The quiet period decision unit in the QPS is adapted to use the information in the received request rules message for updating the decision on the quiet period rule set in the region. This is one motivation for the t_expire field; several request rules messages from different systems may have been received, and the database and quiet period decision unit may try to adapt the quiet period rule set to these systems for the best possible performance;

435: Receive rules specification message. The QPC node receives the rules specification message and stores the received rules and other information received in the rules specification message.

440: Adjust system sensing units to comply with the received rules. The QPC will instruct the access nodes registered to the QPC by sending the received quiet period rules. A message processor in the access nodes will receive the message with the quiet period rules to be used during the next time period. The received message may be the rules specification message received by the QPC and forwarded by the QPC to the access nodes. A message processor in a node will identify the message and distribute the new rule set to the sensing unit, which will store and use the received rules. The sensing unit will be able to control receiver and transmitter units according to the new rules.

445: Wait until time t_expire. The QPS has set an expiration time t_expire for the received quiet period rules. When said expiration time is reached, the QPC is adapted to establish a connection, 405, 410, 415, with the QPS node and send, 425, a new request rules message.

Figure 5:
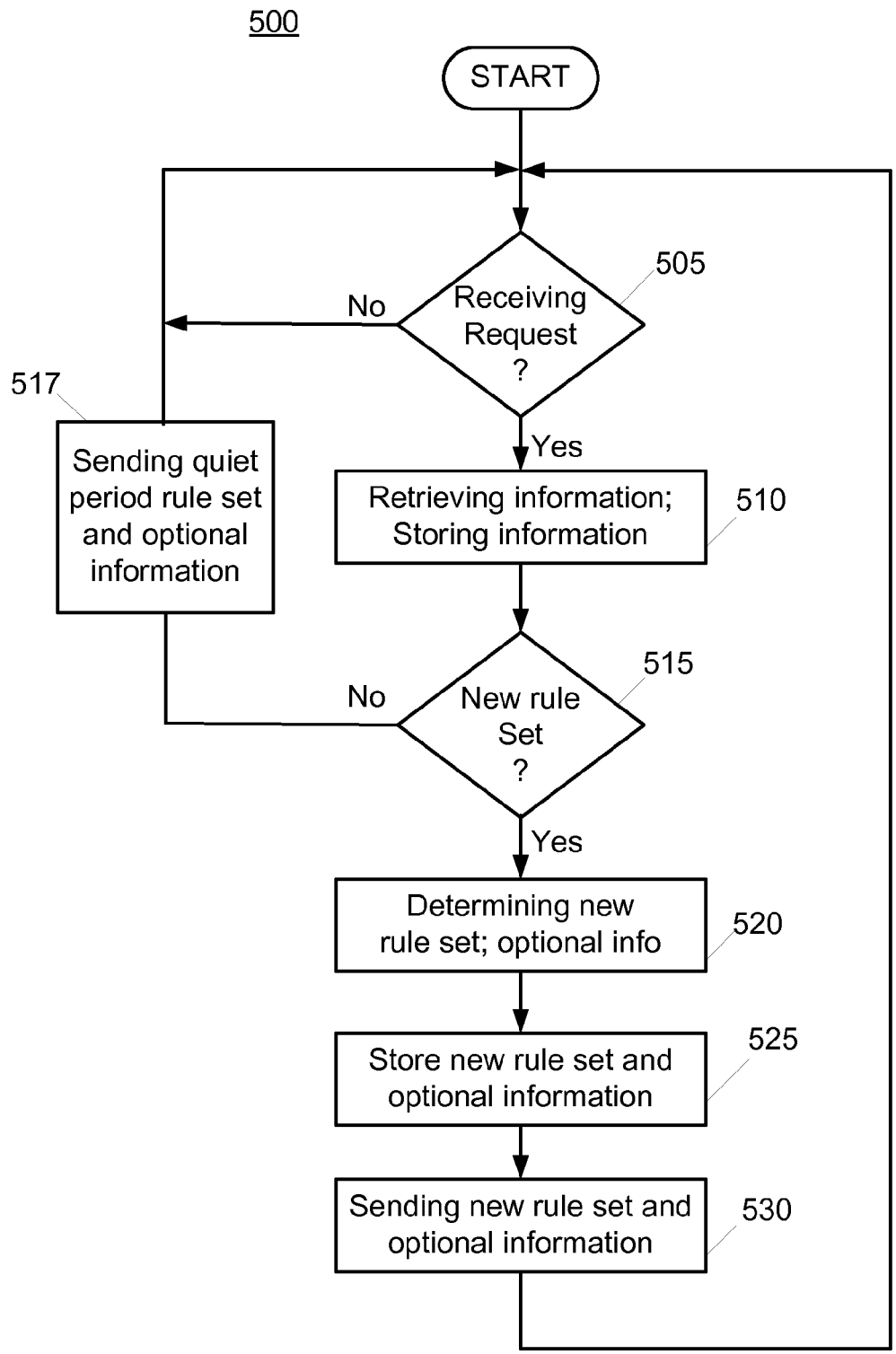
FIG. 5 is a flowchart illustrating another embodiment of the method according to the present invention.

An embodiment of a method 500 according to the present invention is illustrated in FIG. 5. The flowchart presents the actions specified according to one embodiment protocol that is to be followed by the QPS node.

The embodiment of the invention will now be presented in more detail with reference to FIG. 5:

505: Receiving request rule message. The QPS is adapted to wait for a request rules message from a QPC node in a secondary system. As long as a request rules message is not received, No, the QPS will be in a waiting loop, or a waiting mode.

510: Retrieving information; Storing information. When a request rules message is received, the QPS will retrieve the information in the message and the QPS is configured to store all or a part of said information in the database in the QPS node;

515: New rule set test. From the retrieved information of the received rules request message, the QPS starts a decision process wherein the QPS first decides whether a quiet period rule set associated with the requested secondary QPC network node has to be adapted or not. If not a new rule set should be formed, No, the QPS will respond the QPC by sending the present pending quiet period rule set and optional information, 517. On the other hand, if a new quiet rule set is to be formed, Yes, the decision process continues, 520.

517: Sending quiet period rule set and optional information. The QPS responds the QPC by sending the still pending quiet period rule set and optional information.

520: Determining new rule set. In the second step of the decision process, the QPS is determining a quiet period rule set to be sent in a rule specification message to the requesting OPC node. It is also determined if any other information should be enclosed in the message to be sent. As an example, the QPS may determine the length of the expiration time t_expire of the quiet rules.

The decision process is performed based on at least one of the following:

Policies;
Requirements from the requesting system;
Requirements from other systems.

525: Store new rule set and optional information. The QPS may store the new rule set and the determined information in the database before sending the rule specification message.

530: Sending new rule set and optional information. A rule specification message comprising the new rule set and optional information is generated. Said message is addressed and sent to the requesting QPC node via unicast, multicast or broadcast transmission. When the transmission has been performed, the QPS returns to the waiting loop, 505, in which the QPS is waiting for a new request rule message to arrive.

Figure 6:
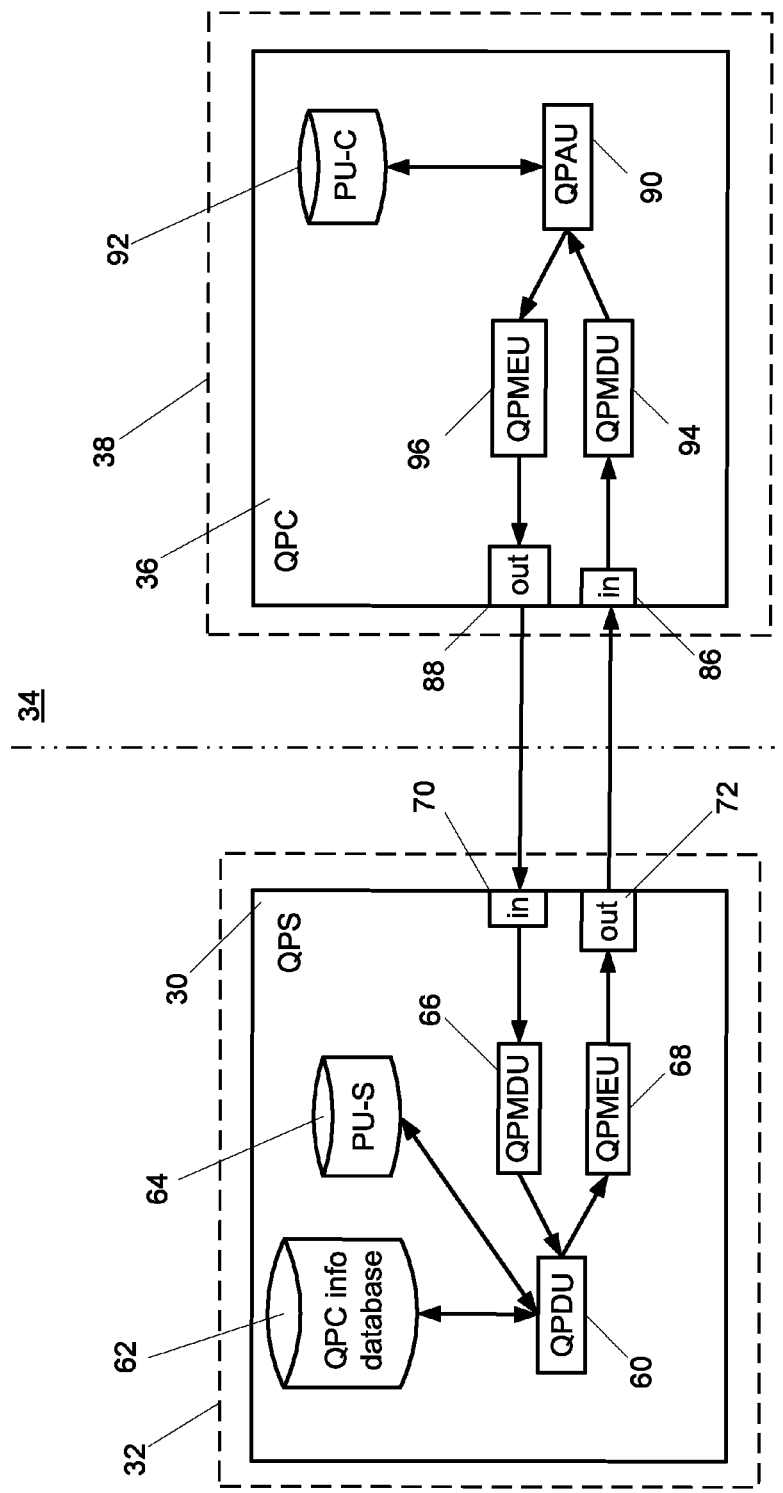
FIG. 6 is a block diagram illustrating an embodiment of a system according to the invention comprising an intersystem network Quiet Period Server node and a Quiet Period Client node of a secondary system network.

FIG. 6 is a system overview of an intersystem network QPS node 32 and a QPC node 38 of a secondary system network 34, said nodes are communicating with each other.

In FIG. 6 is further illustrated an embodiment of a QPS device 30 according to the invention in a QPS node 32 and an embodiment of a QPC device 36 according to the invention in a QPC node 38.

The invention makes use of functionalities in a Quiet Period Server, QPS, and in Quiet Period Client(s), QPC, as described above. With reference to FIG. 6, some example embodiments with functional component structures for the QPS and QPC are presented hereafter. Note that the QPS and QPC may be implemented as functional modules in other units.

In general, a Quiet Period Server may be a server unit for the handling of quiet period messages in both directions. This unit receives requests and formulates replies using the units described below.

According to the following embodiment, a QPS device 30 may comprise the following functional components: a Quiet Period Decision Unit 60, a Quiet Period Client info database 62, a Policy Unit-Server 64, a Quiet Period Message Decoding Unit 66, a Quiet Period Message Encoding Unit 68, an input unit 70 and an output unit 72. The Quiet Period Decision Unit is in this disclosure sometimes denoted decision processing unit, decision unit, or QPDU. All said expressions are to be considered as equivalent.

Figure 7:
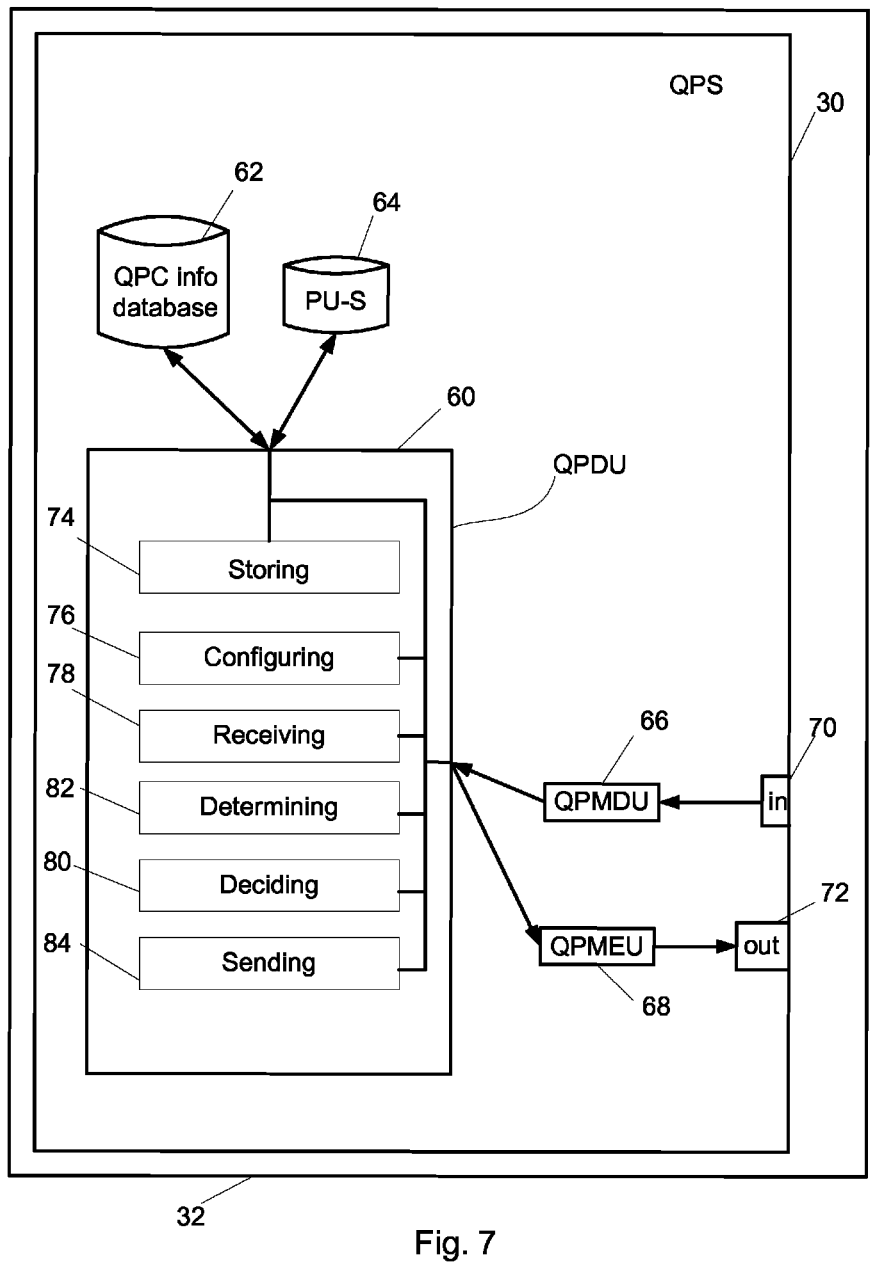
FIG. 7 is a block diagram illustrating an embodiment of a Quiet Period Server device according to the present invention.

The Quiet Period Decision Unit, QPDU, 60 is a unit configured to decide upon the quiet period rule set (s) that should apply to systems using secondary spectrum in a particular coverage area and for a particular duration. It receives and sends quiet period messages from and to QPC(s), receives and stores information received from QPC(s) in the QPC info database 62, and receives and stores information about quiet period policies from the Policy Unit-Server 64. A more detailed description of an embodiment of a QPDU is illustrated in FIG. 7.

The QPC info database 62 is meant for storing information received from the separate QPC(s). The Policy Unit-Server, PU-S, 64 is storing information about quiet period policies. The policies represent any additional information that may be needed by the QPDU in the QPS for its decision, and which does not directly relate to the technical formation of quiet periods. For example, the PU-S could contain policies that prevent certain secondary systems to receive any quiet period rule set information; or it could contain policies encoding some known behaviour of the primary system that needs to be reflected in the decision. Other types of policies can also be included in the PU-S.

The Quiet Period Message Decoding Unit, QPMDUserver, 66 is a unit configured for receiving data and decoding the information. It forwards the information to the QPDU 60. The Quiet Period Message Encoding Unit, QPMEUserver, 68 is the unit that is configured to encode the result of the decision by the QPDU in the appropriate format. The QPS device 30 is provided with input 70 and output 72 interfaces, which are interfaces for enabling the reception of data traffic and sending, respectively, of data traffic containing said information.

Further, as already stated, the QPS is configured to transmit messages to and receive messages from Quit Period Clients dedicated to the QPS by registration.

In general, a Quiet Period Client, QPC, 36 may be a unit which forms and sends requests to the QPS 30, and receives the QPS response and adapts accordingly using the units described below.

According to the following embodiment, a QPC device 36 may comprise the following functional components: a Quiet Period Adaptation Unit 90, a Policy Unit-Client 92, a Quiet Period Message Decoding Unit 94, a Quiet Period Message Encoding Unit 96, an input unit 86 and an output unit 88.

Figure 8:
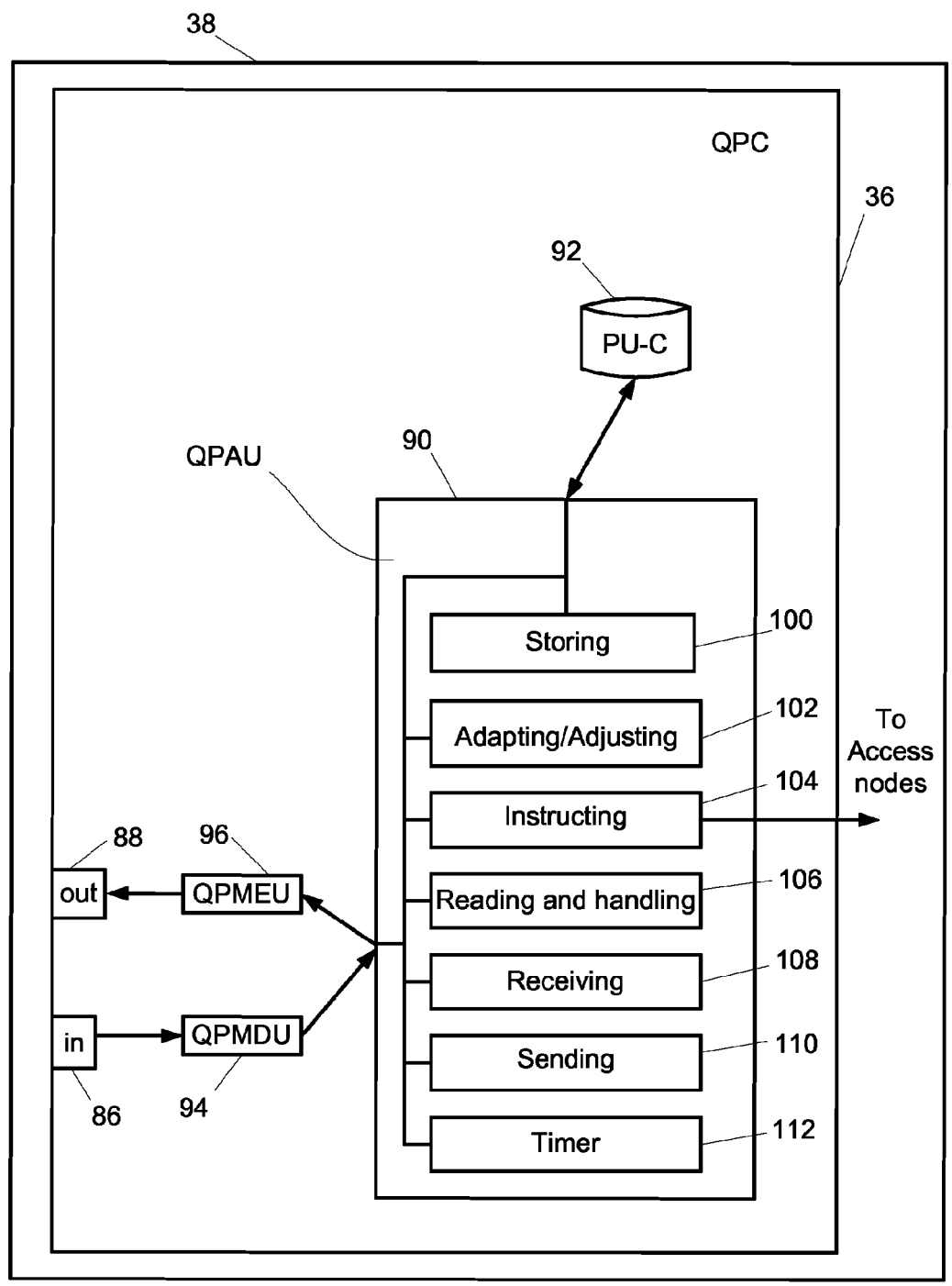
FIG. 8 is a block diagram illustrating an embodiment of a Quiet Period Client device according to the present invention.

The Quiet Period Adaptation Unit, QPAU, 90 is a unit configured to communicate with the policy database 92, i.e. the Policy Unit-Client PU-C, for deciding what information should be sent to the QPDU 60 in the QPS node 32. This information is then encoded by the Quiet Period Message Encoding Unit 96, QPMEUclient. Further the QPAU 90 receives messages from the QPDU 60 via the Quiet Period Message Decoding Unit 94, QPMDUclient, and propagates the information to the access nodes. A more detailed description of an embodiment of a QPAU 90 is illustrated in FIG. 8. The device 36 is provided with input 86 and output 88 interfaces, which are interfaces for enabling the reception of data traffic and sending, respectively, of data traffic containing said information.

The Policy Unit-Client 92, PU-C, is a database containing the desired rules. Note however that the desired rules can be updated by the system so that later request rules messages from the system may include different desired rules.

FIG. 7 is illustrating an embodiment of a Quiet Period Server, QPS, device 30 according to the present invention. Said device is typically located in a QPS node 32 of a network. The exchange of information in the data traffic between the QPS node and the QPC nodes is supported by different message formats. The formats of the messages are specified in FIGS. 9a-9e.

Said QPS node 32 is a network node providing the functionality of supporting intersystem quiet period synchronization of secondary wireless access systems coexisting on a frequency spectrum F1 used by a primary system in a, for said systems, common geographical area. The device 30 comprises a quiet period decision unit 60, denoted Quiet Period Decision Unit, QPDU, configured to provide quiet period rules to Quiet Period Client, QPC, network nodes serving secondary wireless access systems, thereby enabling synchronized quiet periods for all secondary wireless access systems.

One implementation example is the usage of the database and the quiet period decision unit 60 for deriving the optimal/best quiet period rule set. Information about the lengths of the quiet periods from all secondary systems that are present in the region is considered in a decision process and the information is retrieved from the received rule request messages and said database.

The quiet period decision unit 60 is further configured to perform a decision process and the quiet period decision unit therefore comprises a sub module 80 configured for deciding whether a quiet period rule set associated with a first network node QPC has to be adapted, or not. The unit 60 is further provided with a sub module 82 configured for determining a quiet period rule set to be sent to said first network node QPC. Said sub module 82 may also determine the optional information to be transmitted to a secondary system. Said optional information may be the expiration time t_expire.

Let the length of the quiet period that is required by the sensing methods employed in secondary system i be denoted $L_{QP,i}$. Then, in one embodiment of the invention, the quiet period decision unit 60 decides that the length of the upcoming quiet periods will be $$L_{QP} = \max_i L_{QP,i},$$

i.e. it uses the longest required quiet period as the length of future quiet periods. Further it may choose a random time in the future; after all present secondary systems have been informed of the quiet period rule set, for the quiet period to start and a frequency at which the quiet period will be repeated. Note that the systems need to periodically send a request rules message to the QPS node 32. This is ensured by the inclusion of the required field containing t_expire in the rules specification message.

Thus, the decision process may be based on at least one of the following grounds:
  Policies;
  Requirements from the requesting system;
  Requirements from other systems associated with the second network node, i.e. QPS.

The quiet period decision unit 60 further comprises a sub module 84 configured for sending the quiet period rule set, and any optional information, to said first network node, transmitted via unicast, multicast or broadcast transmission.

The quiet period decision unit 60 further comprises a sub module 76 adapted for configuring the quiet period rule set to be sent to comprise quiet period rules, and any of the optional information:
- Specification for setting the expiration time (t_expire) of the rule set;
- Other present secondary access systems in the area;
- Random seed for allowing quiet period randomization;
- Which frequency bands the rules apply to;
- Parameter Specification for of the sensing algorithm.

The quiet period decision unit 60 further comprises a sub module 78 for receiving a message requesting for a quiet period rule set from an associated first network node of a secondary access system. The sub module 78 is configured to identify at least a message identifier, and any of following optional information regarding the secondary wireless access system of which the first node is a part:
- The location of the system;
- Desired quiet period rule(-s);
- Sensing properties of the system;
- Radio access technologies, frequencies and bandwidths that said system may use;
- Transmission parameters;
- Timer value t_valid denoting for how long time the information in the request message is valid;
- Keep old information-flag indicates that the information which is not overwritten by the current message is still valid until a new message is sent or until timer value t_valid expires.

The quiet period decision unit 60 is further comprising a sub module 74 configured for storing received quiet period requests and the sent quiet period rule set in a data base in the second network node, said stored the quiet period rule set enabling decisions regarding update information for quiet period rule sets for other wireless access systems associated with the Quiet Period Server.

The QPS device 30 is provided with a Quiet Period Message Decoding Unit, QPMDUserver, 66 is a unit configured for receiving data and decoding the information. It forwards the information to the QPDU. The QPS device 30 is provided with a Quiet Period Message Encoding Unit 68, QPMEUserver, which is a unit that encodes the result of the decision by the QPDU in the appropriate format. The QPS device 30 is provided with input 70 and output 72 interfaces, which are interfaces for enabling the reception of data traffic and sending, respectively, of data traffic containing said information.

The sub modules 74, 76, 78, 80, 82, 84 of the quiet period decision unit 60, and the QPMDUserver 66 and QPMEUserver 68 in the node device QPS 30 may be implemented in digital electronically circuitry, or in computer hardware, firmware, software, or in combinations of them. Apparatus of the invention may be implemented in a computer program product tangibly embodied in a machine readable storage device for execution by a programmable processor; and method steps of the invention may be performed by a programmable processor executing a program of instructions to perform functions of the invention by operating on input data and generating output.

The QPDU 60 may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially-designed ASICs (Application Specific Integrated Circuits).

The QPC info database 62 is meant for storing information received from the separate QPC(s). The Policy Unit-Server, PU-S, 64 is storing information about quiet period policies. The policies represent any additional information that may be needed by the QPDU in the QPS for its decision, and which does not directly relate to the technical formation of quiet periods. For example, the PU-S could contain policies that prevent certain secondary systems to receive any quiet period rule set information; or it could contain policies encoding some known behaviour of the primary system that needs to be reflected in the decision. Other types of policies can also be included in the PU-S.

FIG. 8 is illustrating an embodiment of a Quiet Period Client, QPC, device 36 according to the present invention. Said device 36 is typically located in a QPC node 38 of a network. The exchange of information in the data traffic between the QPS node and the QPC nodes is supported by different message formats. The formats of the messages are specified in FIGS. 9a-9e.

The QPC device 36 is preferably located in a node 38 of a secondary network, i.e. a first network node, QPC node, and supports intersystem quiet period synchronization of secondary wireless access systems coexisting on a frequency spectrum used by a primary system. Said systems are operating in a common geographical area (10 in FIG. 1). The device 36 comprises a Quiet Period Adaptation Unit, QPAU, 90 configured to obtain a quiet period rule set from a QPS node, i.e. second network node. Said rule set is common to all or a number of said secondary wireless access systems. The quiet period rule set is obtained by sending a message requesting for quiet period rule set to said QPS node and receiving said quiet period rule set and optional information, as described in the embodiment of the method illustrated in FIG. 4. The Policy Unit-Client 92, PU-C, is a database containing the desired rules. The device 36 is therefore provided with storage 100 for storing an obtained quiet period rule set in a data base in the Quiet Period Client.

The Quiet Period Adaptation Unit 90 is therefore provided with a sub module 110 configured for sending a message requesting for a quiet period rule set to said QPS node.

The sub module 110 configured for sending a message requesting for quiet period rule set is configured to provide said message with at least a message identifier, and any of following optional information regarding the secondary wireless access system of which the first node is a part:
- The location of the system;
- Desired quiet period rule set (-s);
- Sensing properties of the system;
- Radio access technologies, frequencies and bandwidths that said system may use;
- Transmission parameters;

Timer value t_valid denoting for how long time the information in the request message is valid;

Keep old information-flag indicates the information, which is not overwritten by the current message, is still valid until a new message is sent or until timer value t_valid expires.

For obtaining the quiet period rule set, the Quiet Period Adaptation Unit 90 is also comprising a sub module 108 configured for receiving said quiet period rule set and optional information transmitted via unicast, multicast or broadcast transmission by said second network node. The Quiet Period Adaptation unit 90 further comprises a sub module 106 adapted to read and handle quiet periods rules, and other optional information, such as:

specification for setting the expiration time (t_expire) of the rule set;

Other present secondary access systems in the area;

Random seed for allowing quiet period randomization;

Which frequency bands the rules apply to;

Parameter Specification for the sensing algorithm.

The Quiet Period adaptation unit 90 is further comprising sub module 102 to adapt to the obtained quiet period rule set by storing the obtained rule set or by adjusting quiet period rule set stored in said node device according to the obtained quiet period rule set. A timer sub module 112, e.g. clock, timer, is provided in the unit 90 for monitoring handling different time periods, time intervals, and a reference clock, which are set by time parameters, e.g. t_valid, t_expire, etc, that have been predefined or received in a rule specification message.

Further, the Quiet Period Adaptation Unit QPAU 90 also comprises a sub module 104 configured to instruct one or more access nodes (40 in FIG. 3), which is a part of said secondary wireless access systems to perform transmission according to the obtained quiet period rule set. Said sub module 104 is configured to instruct the access nodes by sending the received quiet rule set to each access node in its secondary system network.

The Quiet Period Adaptation Unit, QPAU, 90 is a unit configured to communicate with the policy database 92, i.e. the Policy Unit-Client PU-C, for deciding what information should be sent to the QPDU 60 in the QPS node. This information is then encoded by the Quiet Period Message Encoding Unit 96, QPMEUclient. Further the QPAU 90 receives messages from the QPDU 60 via the Quiet Period Message Decoding Unit 94, QPMDUclient, and propagates the information to the access nodes. The device 36 is provided with input 86 and output 88 interfaces, which are interfaces for enabling the reception of data traffic and sending, respectively, of data traffic containing said information.

The sub modules 102, 104, 106, 108, 110, 112 of the Quiet Period Adaptation Unit, QPAU, 90 in the node device QPC 36 may be implemented in digital electronically circuitry, or in computer hardware, firmware, software, or in combinations of them. Apparatus of the invention may be implemented in a computer program product tangibly embodied in a machine readable storage device for execution by a programmable processor; and method steps of the invention may be performed by a programmable processor executing a program of instructions to perform functions of the invention by operating on input data and generating output.

The Quiet Period Adaptation Unit, QPAU, 90 may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially-designed ASICs (Application Specific Integrated Circuits).

The exchange of information in the data traffic between the QPS node and the QPC nodes is supported by different message formats. The formats of the messages are specified in FIGS. 9a-9e.

Figure 9:
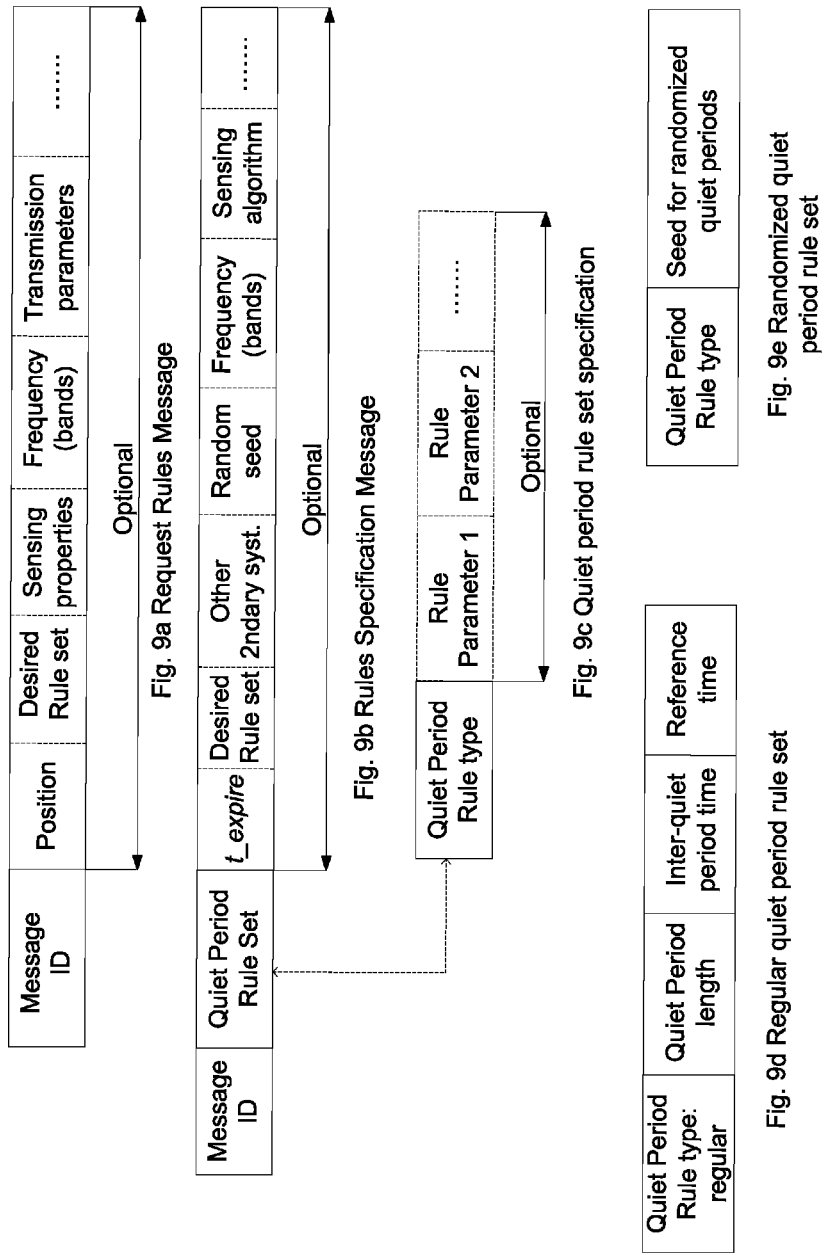
FIGS. 9a-e are block diagrams illustrating different format embodiments of the messages used in a system and in a method according the invention.

In FIG. 9a, an embodiment of a format of a request rules message is illustrated.

The request rules message is required to contain a Message ID, which is a Message identifier for informing that the received message is a request rules message. As indicated in FIG. 9a, the message may carry a number of different information. The optional content of the request rules message may be:

Position: which is the location area/position(s) of the request rules message sending secondary system;

Desired rules: Desired quiet period rule(s) requested by the sending secondary system;

Sensing properties: Sending secondary systems sensing properties (so that QPS may adapt the rules according to said properties), including possibly information on required sensing times and whether the sensing can utilize data sampled at different time instances (i.e., measured at more than one quiet period);

Frequency (bands): What radio access technologies, frequencies and bandwidths the message sending secondary system may use;

Transmission parameters: Information regarding transmission parameters of the secondary system, e.g. transmission power, antenna diagrams/Equivalent Isotropic Radiated Power (EIRP), etc.

Further optional information that could be inserted in the request rules message is:

t_valid: It is a timer parameter value indicating for how long time the parameters of the secondary system should be taken into account when forming a decision on the quiet period rule set. This parameter can be used by the QPS, e.g., to decide for how long the forthcoming rules should be active via the parameter t_expire Keep old information-flag: If this flag is set, the information that was sent previously is still valid. If this flag is set, but some additional content is specified, the new content overrides earlier conflicting content.

In FIG. 9b, an embodiment of a format of a rules specification message is illustrated.

The rules specification message is required to contain a

Message ID, which is a Message identifier for informing that the received message is a rules specification message; and Quiet period rule set. The rules to be used in the secondary system are specified, e.g. quiet period interval and length, reference time;

As indicated in FIG. 9b, the message may carry a number of different information.

The optional content of the rules specification message may be:
- Rule expire time: The expiration time of the rule, t_expire. After said time period the system needs to check the database again to get valid quiet period rules for its sensing;
- Other secondary system: Information about other present secondary systems in the area and technical specifications of these;
- Random seed: Random seed setting for allowing for quiet period randomization;
- Frequency (bands): What radio access technologies, frequencies and bandwidths the message sending secondary system may use;
- Sensing algorithm: Specification of the sensing algorithm and may be an executable code package to be used in a Software Defined Radio, SDR.

An embodiment of a detailed specification of the quiet period rules components in the request rules and rules specification messages is illustrated in FIG. 9c.

The specification of the components of the quiet period rules, such as the "Desired rule set" and "quiet period rule set", is required to contain:
- Quiet period rule type: the quiet rule type may be set to regular or randomized. Rule parameter(s), e.g. Rule parameter 1, Rule parameter 2, . . . , is optional content of the specification.

In FIGS. 9d and 9e, examples of the rule specification message of the quiet period rules are illustrated.

A regular quiet period rules specification may be configured as in FIG. 9d. The quiet rule type is set to regular. Rule parameter 1 states the setting of the length of the quiet period, Rule parameter 2 states the setting of the length of the Inter-quiet period time, and Rule parameter 3 states the setting of the reference time. Thus, the exemplified specification states the quiet periods are of equal length and spaced (in time) at equal intervals. A reference time is given for synchronization. It represents the QPS view on the current clock time (at message creation) in some absolute representation of clock time, for example, using Coordinated Universal Time (UTC). The receiving QPC may use the reference time to synchronize the operation of its associated secondary system quiet-period sensing with those of all other secondary systems that follow the same quiet period rule set. Inaccuracies from differing transmission and processing times in the different secondary systems is typically acceptable, since the time scale in the quiet period operation is expected to be much larger that the transmission and processing times.

A randomized quiet period rules specification may be configured as in FIG. 9e. The quiet rule type is set to randomized. Rule parameter 1 states the seed for randomized quiet periods.

According to one embodiment of the present invention information regarding synchronized sensing periods is used for "unsynchronized sensing", i.e. when the system performs spectrum sensing to detect other secondary systems during times when they are active. This would provide a good view of the actual radio environment and enable the system to adjust its own transmissions and chosen channel(s) to the situation. This approach will avoid an overly crowded spectrum.

Figure 10:
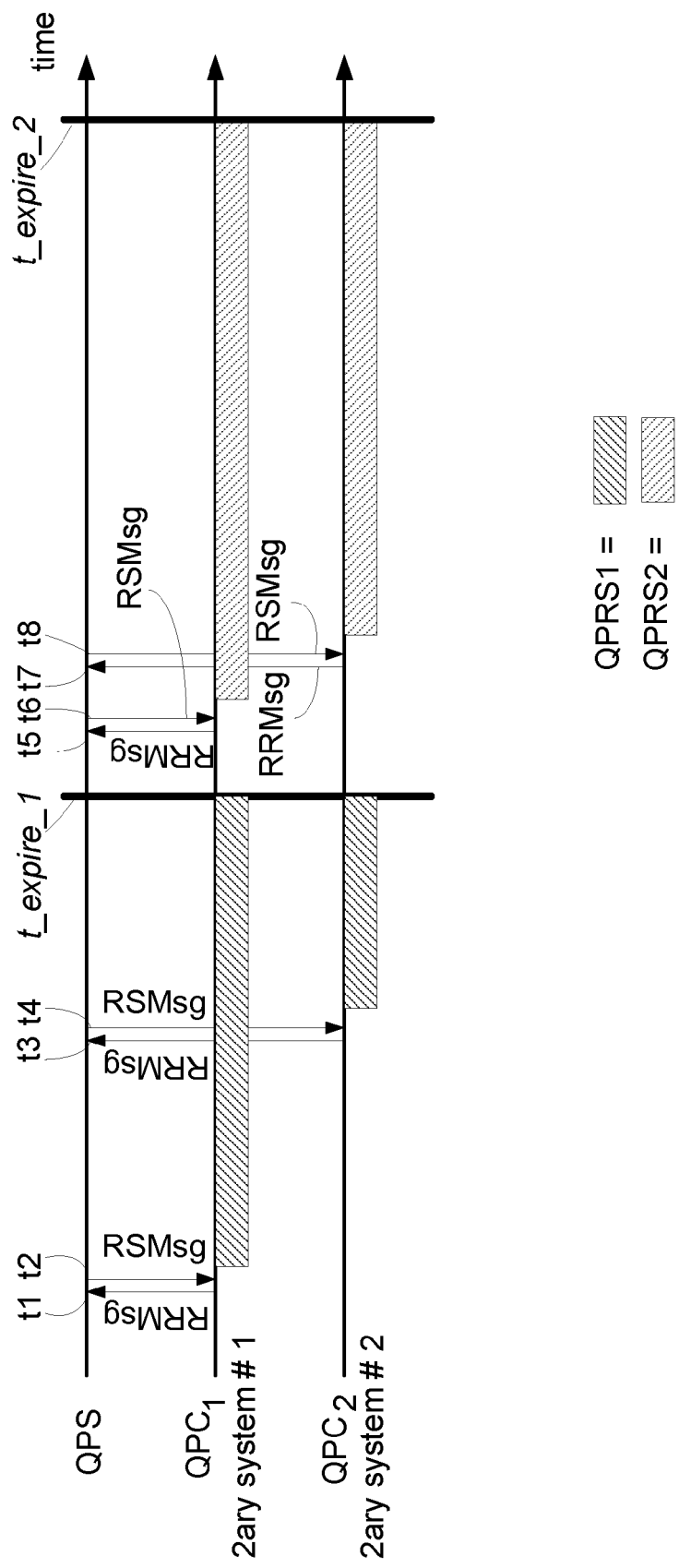
FIG. 10 is a signaling scheme illustrating an example of how messages are transmitted between node entities of secondary systems over time of an embodiment of the present invention.

FIG. 10 is a signaling scheme illustrating an example of how messages are transmitted between node entities of secondary systems over time of an embodiment of the present invention.

In the following example, two secondary systems and a primary system (not shown) are co-existing and operating simultaneously. The primary system is using a first radio frequency band, primary frequency band, for signal transmission of data traffic and/or broadcasting. The secondary systems, 2ary system #1 and 2ary system #2, are using a second radio frequency band or different secondary radio frequency bands. The secondary systems are also configured to use the primary frequency band. For not interfering with the signal traffic of the users of the primary frequency band, the secondary systems are configured to listen synchronized for the signal intensity/activity in the primary frequency band. In accordance with the invention, the synchronization of the listening of the secondary systems are controlled by means of quiet period rule sets that are managed and distributed by a Quiet Period Server QPS to Quiet Period Clients QPCs in the secondary systems.

The 2ary system #1 comprises a Quiet Period Client 1, $QPC_1$, and the 2ary system #2 comprises a Quiet Period Client 2, $QPC_2$. Said QPCs are configured to communicate with the Quiet Period Server QPS.

Three parallel time lines are illustrated, one for the QPS, one for the $QPC_1$ of the 2ary system #1 and one for the $QPC_2$ of the 2ary system #2. Further, in the illustrated example is two different Quiet Period Rule Sets, QPRS used, e.g. Quiet Period Rule Set_1, QPRS1, or QPRS_2, QPRS2, is transmitted to the QPC of a secondary system and applied in the system.

At time t1, $QPC_1$ generates a request rules message RRMsg comprising the desired Quiet Period Rule Set and system related information and sends it to the QPS. The system information is optional. Upon reception of RRMsg, the QPS decides for a suitable QPRS to be applied for the requesting system and a t_expire value for said set of rules to be valid. Said decision may be based on information in the received message about the system and on stored information about the system and other systems of the common geographical area for which the QPS is synchronization responsible.

As an example, the decision of the QPS may only be based on system information concerning the separate requesting system, i.e. in this case secondary system #1. Therefore, the decision is to select a set of quiet period rules QPRS1, which only takes into account that system #1 is operating in the area. A quiet period rule set only taking into account the requirements of the own system is said to be optimized for said system.

At t2, the QPS generates and sends a rules specification message, RSMsg, comprising the decided and selected quiet period rule set and the t_expire time, t_expire_1, to $QPC_1$, which forwards said message to the access nodes of the system and sets a timer sub module (112 in FIG. 8) according to the received value of the t_expire parameter. Said timer may be denoted t_expire timer and it measures the period for which the applied QPRS is valid. Said period is indicated in the figure by a hatched interval under the time line of 2ary system #1. Note that the difference between the times t2 and t1 is the time it takes for the QPS to perform the necessary processing to reach a decision on the Quiet Period Rule Set.

At time t3, $QPC_2$ generates a request rules message comprising system related information as well as the 2ary system #2 desired Quiet Period Rule Set, and sends it to the QPS, which decides that the quiet period rule set in use by system #1, i.e. QPRS1, should also be used by system #2, and the expiration time t_expire_1 for QPRS1 in system #2 should expire at the same time as QPRS1 in system #1.

When having reached the said decision, at t4, the QPS sends a rules specification message comprising the decided and selected quiet period rule set and the t_expire time to $QPC_2$, which forwards said message to the access nodes of the system and sets the t_expire timer according to the received value of the t_expire time parameter, i.e. t_expire_1.

When a t_expire timer of a system indicates that t_expire_1 has occurred, or expired, the QPC of a secondary system is configured to generate a new RRMsg momentary or within a short time period. If a plurality of secondary systems are managed by a single QPS, and the expiration time of all said systems expire at the same time, the QPS might be congested by the reception of all RRMsgs generated and arriving at the same time. To avoid congestion, the generation and transmission of RRMsg from different QPSs may be spread over said short time period after that the expiration time has expired. Preferably, said short time period is very short.

During the period from t_expire time has expired and at the arrival of a new RSMsg, the system may use the quiet period rule set used during the previous t_expire period.

At time t5, $QPC_1$ generates a request rules message RRMsg comprising the desired quiet period rule set and system related information and sends it to the QPS. Upon reception of the RRMsg, the QPS decides for a suitable QPRS to be applied for the requesting system and a t_expire value t_expire_2 for said set of rules to be valid. As more than one system are operating in the same geographical area, the QPS is adapted to decide to select a quiet period rule set and expiration time based on system information concerning secondary systems #1 and #2.

In the illustrated example, said selected quiet period rule set is indicated as QPRS2, which takes into account that both systems #1 and #2 are operating in the area. QPRS2 is optimal, in some respect, for the two systems operating in the same geographical area.

At t6, the QPS generates and sends a rules specification message, RSMsg, comprising the decided and selected quiet period rule set QPRS2 and the t_expire time, t_expire_2, to $QPC_1$, which forwards said message to the access nodes of the system and sets a timer according to the received value of the t_expire parameter.

At time t7, $QPC_2$ generates a request rules message RRMsg comprising system related information and sends it to the QPS, which decides that the quiet period rule set in use by system 1, i.e. QPRS2, should also be used by system #2, and the expiration time t_expire for QPRS2 in system #2 should expire at the same time as QPRS 2 in system #1, i.e. t_expire_2.

At t8, the QPS sends the rules specification message RSMsg comprising the decided and selected quiet period rule set QPRS2 and the t_expire time to $QPC_2$, which forwards said message to the access nodes of the system and sets the t_expire timer according to the received value, t_expire_2, of the t_expire time parameter.

When t_expire timer of a system indicates that t_expire_2 has occurred, or expired, the QPC of said secondary system is configured to generate a new RRMsg momentary or within a short time period.

It must be pointed out that $QPC_2$ may generate and send a request rules message RRMsg before $QPC_1$ sends a RRMsg to the QPS. Further, the QPS may receive a RRMsg from $QPC_1$ and a RRMsg from $QPC_2$ before the QPS responds to $QPC_1$ with a RSMsg. Thus, the present invention is not limited by the illustrated example. When a certain QPC is sending a RRMsg may be controlled by the set t_expire parameter value for a certain quiet period rule set.

The QPS may decide that all systems, the systems #1 and #2 as illustrated in the figure, or some of the systems should use the same t_expire expiration time value. However, in other embodiments, different t_expire expiration time values may be decided to be used in different systems. Said different t_expire expiration time values may be generated by a random generator. The random t_expire expiration time values should have the same expectation value and with a variance being significantly smaller than the expectation value.

A number of embodiments of the present invention have been described. It will be understood that various modifications may be made without departing from the scope of the invention. Therefore, other implementations are within the scope of the following claims defining the invention.

The invention claimed is:

1. Method in a first network node for supporting intersystem quiet period synchronization of secondary wireless access systems coexisting on a frequency spectrum used by a primary system in a, for said systems, common geographical area, the method comprises:
    obtaining a quiet period rule set from a second network node being an intersystem node common to all or a number of the secondary wireless access systems, said quiet period rule set being common to all or a number of said secondary wireless access systems; and
    instructing one or more access nodes, which are part of said secondary wireless access systems, to perform transmission according to the obtained quiet period rule set, the quiet period rule set used to synchronize quiet periods for all secondary wireless access systems,
    wherein the first network node is a client network node comprising a Quiet Period Client for performing said method, and which is associated to a Quiet Period Server in said second network node, which is an intersystem node, common to all or a number of secondary wireless access systems in the geographical area.

2. The method according to claim 1, wherein the method further comprises:
    adapting to the obtained quiet period rule set by storing the obtained quiet period rule set in said first network or by adjusting the quiet period rule set stored in said first network node according to the obtained quiet period rule set.

3. The method according to claim 1, wherein obtaining a quiet period rule set from a second network node comprises:
    receiving the quiet period rule set via unicast, multicast or broadcast transmission from said second network node.

4. The method according to claim 1, wherein obtaining a quiet period rule set from a second network node further comprises:
    sending a message requesting for quiet period rule set to said second network node, wherein the message requesting for quiet period rule set comprises at least a message identifier.

5. Method in a second network node for supporting intersystem quiet period synchronization of secondary wireless access systems coexisting on a frequency spectrum used by a primary system in a, for said systems, common geographical area, the second network node being an intersystem node common to all or a number of the secondary wireless access systems, and the method comprises:
    providing a quiet period rule set to a first network node serving a secondary wireless access system, the quiet period rule set used to synchronize quiet periods for all secondary wireless access systems in the geographical area, wherein the first network node is a client network node comprising a Quiet Period Client, which is associated to a Quiet Period Server for performing said method in said second network node, which is an intersystem node, common to all or a number of secondary wireless access systems in the geographical area.

6. Method according to claim 5, wherein the providing a quiet period rules is further comprising a decision process:
   deciding whether a quiet period rule set associated with a first network node has to be adapted, or not; and
   determining a quiet period rule set to be sent to said first network node.

7. The method according to claim 5, wherein providing a quiet period rule set to a first network node further comprises:
   sending the quiet period rule set via unicast, multicast or broadcast transmission.

8. The method according to claim 5, wherein providing a quiet period rule set is further comprising:
   receiving a message requesting for quiet period rule set from an associated first network node of a secondary access system, said message comprising at least a message identifier;
   storing received quiet period requests and the sent quiet period rule set in a data base in the second network node, said stored quiet period rule set enabling decisions regarding quiet period rule sets for other wireless access systems associated with the Quiet Period Server.

9. Node device in a first network node for supporting intersystem quiet period synchronization of secondary wireless access systems coexisting on a frequency spectrum used by a primary system in a, for said systems, common geographical area, characterized in that the device is comprising a Quiet Period Adaptation Unit configured to:
   obtain a quiet period rule set from a second network node being an intersystem node common to all or a number of the secondary wireless access systems, said rule set being common to all or a number of said secondary wireless access systems; and
   instruct one or more access nodes, which is a part of said secondary wireless access systems to perform transmission according to the obtained quiet period rule set, the quiet period rule set used to synchronize quiet periods for all secondary wireless access systems,
   said device is a Quiet Period Client, which is associated to a Quiet Period Server in said second network node, which is an intermediate system node, common to all or a number of secondary wireless access systems in the geographical area.

10. The node device according to claim 9, wherein the Quiet Period Adaptation Unit is further configured to adapt to the obtained quiet period rule set by storing in said first network the obtained rule set or by adjusting quiet period rule set stored in said node device according to the obtained quiet period rule set.

11. The node device according to claim 9, wherein the Quiet Period Adaptation Unit comprises a sub module configured for receiving said quiet period rule set transmitted via unicast, multicast or broadcast transmission by said second network node.

12. The device according to claim 9, wherein the Quiet Period Adaptation Unit further comprises a sub module configured for sending a message requesting for quiet period rule set to said second network node, said message comprising a message identifier.

13. Device in a second network node for supporting intersystem quiet period synchronization of secondary wireless access systems coexisting on a frequency spectrum used by a primary system in a, for said systems, common geographical area, the second network node being an intersystem node common to all or a number of the secondary wireless access systems, and the device comprises:
   a Quiet Period Decision Unit configured to provide a quiet period rule set to a first network node serving a secondary wireless access system, the quiet period rule set used to synchronize quiet periods for all secondary wireless access systems,
   wherein the device is a Quiet Period Server in said second network node, which is an intersystem node, common to all or a number of secondary wireless access systems in the geographical area, and the first network node is a client network node comprising a Quiet Period Client, which is associated to a Quiet Period Server.

14. The device according to claim 13, wherein the Quiet Period Decision Unit is further configured to perform a decision process, and comprising:
   sub module configured for deciding whether a quiet period rule set associated with a first network node has to be adapted, or not; and
   sub module configured for determining a quiet period rule set to be sent to said first network node.

15. The device according to claim 13, wherein the device further comprises a sub module configured for sending the quiet period rule set to said first network node, transmitted via unicast, multicast or broadcast transmission.

16. The device according to claim 13, wherein the device is further comprising:
   sub module configured for receiving a message requesting for quiet period rule set from an associated first network node of a secondary access system, said message comprising at least a message identifier;
   sub module configured for storing received quiet period requests and the sent quiet period rule set in a data base in the second network node, said stored quiet period rule set used for decisions regarding quiet period rule sets for other wireless access systems associated with the Quiet Period Server.

* * * * *